(12) United States Patent
Akano

(10) Patent No.: US 11,183,208 B2
(45) Date of Patent: Nov. 23, 2021

(54) RECORDING DEVICE, CONTROL DEVICE, RECORDING METHOD, RECORDING TAPE CARTRIDGE, AND DATA RECORDING AND REPRODUCING SYSTEM

(71) Applicant: FUJIFILM CORPORATION, Tokyo (JP)

(72) Inventor: Yoichi Akano, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 17/116,715

(22) Filed: Dec. 9, 2020

(65) Prior Publication Data
US 2021/0090597 A1 Mar. 25, 2021

Related U.S. Application Data

(62) Division of application No. 16/120,328, filed on Sep. 3, 2018, now Pat. No. 10,896,691.

(30) Foreign Application Priority Data

Sep. 4, 2017 (JP) .............................. JP2017-169379

(51) Int. Cl.
*G11B 5/584* (2006.01)
*G11B 5/008* (2006.01)
(Continued)

(52) U.S. Cl.
CPC .......... *G11B 5/584* (2013.01); *G11B 5/00813* (2013.01); *G11B 5/588* (2013.01);
(Continued)

(58) Field of Classification Search
None
See application file for complete search history.

(56) References Cited

U.S. PATENT DOCUMENTS 6,239,939 B1 5/2001 Bui et al.
6,532,128 B1 3/2003 Bui et al.
(Continued)

FOREIGN PATENT DOCUMENTS

JP H06-150201 A 5/1994
JP H09-63218 A 3/1997
(Continued)

OTHER PUBLICATIONS

English language translation of the following: Office action dated Oct. 29, 2019 from the JPO in a Japanese patent application No. 2017-169379 corresponding to the instant patent application.
(Continued)

*Primary Examiner* — Tan X Dinh
(74) *Attorney, Agent, or Firm* — Solaris Intellectual Property Group, PLLC

(57) ABSTRACT

A recording device, a control device, a recording method, a recording tape cartridge, and a data recording and reproducing system capable of accurately positioning a data recording and reproducing head are obtained. A recording device includes a recording unit that records information on linearity of a servo signal recorded on a magnetic tape included in a recording tape cartridge on an RFID tag included in the recording tape cartridge.

7 Claims, 8 Drawing Sheets

(51) Int. Cl.
*G11B 5/596* (2006.01)
*G11B 5/588* (2006.01)

(52) U.S. Cl.
CPC ...... *G11B 5/59633* (2013.01); *G11B 5/59638* (2013.01); *G11B 5/59644* (2013.01); *G11B 5/59666* (2013.01); *G11B 5/59683* (2013.01)

(56) References Cited

U.S. PATENT DOCUMENTS

| | | | |
|---|---|---|---|
| 8,767,331 B2 | 7/2014 | Wagner et al. | |
| 10,629,228 B2* | 4/2020 | Kaneko | G11B 5/00813 |
| 10,783,023 B2* | 9/2020 | Tokai | G06F 11/073 |
| 10,896,691 B2* | 1/2021 | Akano | G11B 5/584 |
| 10,902,877 B2* | 1/2021 | Kagawa | G11B 5/00813 |
| 2003/0151844 A1 | 8/2003 | Eaton et al. | |
| 2004/0091746 A1 | 5/2004 | Nakamura et al. | |
| 2004/0233566 A1 | 11/2004 | Jaquette | |
| 2005/0117493 A1 | 6/2005 | Sueki et al. | |
| 2005/0122615 A1* | 6/2005 | Horimai | G11B 23/107 360/77.12 |
| 2005/0254170 A1 | 11/2005 | Dugas et al. | |
| 2005/0280920 A1 | 12/2005 | Bui et al. | |
| 2006/0012910 A1* | 1/2006 | Jaquette | G11B 15/087 360/69 |
| 2008/0117539 A1 | 5/2008 | Bui et al. | |
| 2008/0278844 A1* | 11/2008 | Kawakami | G11B 5/584 360/77.12 |
| 2009/0279197 A1 | 11/2009 | Kawakami et al. | |
| 2010/0202083 A1 | 8/2010 | Bui et al. | |
| 2012/0305692 A1 | 12/2012 | Suzuki et al. | |
| 2012/0314318 A1 | 12/2012 | Olson et al. | |
| 2012/0314319 A1 | 12/2012 | Olson et al. | |
| 2012/0314320 A1 | 12/2012 | Olson et al. | |
| 2013/0100554 A1 | 4/2013 | Biskeborn et al. | |
| 2019/0139569 A1 | 5/2019 | Bui et al. | |
| 2019/0362743 A1 | 11/2019 | Kaneko et al. | |
| 2020/0273489 A1* | 8/2020 | Kaneko | G11B 5/59638 |
| 2020/0312366 A1* | 10/2020 | Kagawa | G11B 5/596 |
| 2021/0065741 A1* | 3/2021 | Nakao | G11B 5/584 |
| 2021/0098016 A1* | 4/2021 | Suzuki | G11B 5/00813 |
| 2021/0098018 A1* | 4/2021 | Nakao | G11B 5/00813 |

FOREIGN PATENT DOCUMENTS

| | | |
|---|---|---|
| JP | 2006-147034 A | 6/2006 |
| JP | 2007-536683 A | 12/2007 |
| JP | 2008-217964 A | 9/2008 |
| JP | 2012-252744 A | 12/2012 |

OTHER PUBLICATIONS

Least-Squares Calculation of Timing-based-slope, from compound M-pattern Timing-based-servo, IBM, May 11, 2007.
Restriction Requirement dated Jun. 3, 2019 from the US Patent Office in a U.S. Appl. No. 16/120,328.
Non-Final Office action dated Aug. 19, 2019 from the US Patent Office in a U.S. Appl. No. 16/120,328.
Final Office action dated Jan. 13, 2020 from the US Patent Office in a U.S. Appl. No. 16/120,328.
Advisory action dated Apr. 13, 2020 from the US Patent Office in a U.S. Appl. No. 16/120,328.
Non-Final Office action dated May 12, 2020 from the US Patent Office in a U.S. Appl. No. 16/120,328.
Final Office action dated Aug. 20, 2020 from the US Patent Office in a U.S. Appl. No. 16/120,328.
Notice of Allowance issued by USPTO in U.S. Appl. No. 16/120,328, dated Oct. 7, 2020.

* cited by examiner

| SERVO POSITION | DISTANCE [μm] |
|---|---|
| 0 | 21.389 |
| 1 | 22.613 |
| 2 | 23.837 |
| 3 | 25.062 |
| 4 | 26.286 |
| ... | ... |

| SERVO BAND | SERVO POSITION | DISTANCE [μm] |
|---|---|---|
| 0 | 0 | 21.389 |
|  | 1 | 22.613 |
|  | 2 | 23.837 |
|  | 3 | 25.062 |
|  | 4 | 26.286 |
|  | ... | ... |
| 1 | ... | ... |
| ... | ... | ... |

RECORDING DEVICE, CONTROL DEVICE, RECORDING METHOD, RECORDING TAPE CARTRIDGE, AND DATA RECORDING AND REPRODUCING SYSTEM

CROSS-REFERENCE TO RELATED APPLICATION

This application is a divisional application of, and claims priority to, U.S. application Ser. No. 16/120,328, filed Sep. 3, 2018. This application claims priority to Japanese Patent Application No. 2017-169379 filed on Sep. 4, 2017. The disclosures of the applications referenced above are incorporated by reference herein in their entireties.

BACKGROUND OF THE INVENTION

1. Field of the Invention

The present disclosure relates to a recording device, a control device, a recording method, a recording tape cartridge, and a data recording and reproducing system.

2. Description of the Related Art

A technology for providing a plurality of fixed magnetic heads arranged side by side in a tape width direction on a traveling path of a tape-shaped information recording medium and measuring linearity of a signal track using outputs of the plurality of fixed magnetic heads has been proposed (see JP1994-150201A (JP-H06-150201A)).

Further, a technology for performing position control of a magnetic head on the basis of an off-track amount based on tape fluctuation information and an off-track amount of the magnetic head calculated from information on a head position has been proposed (see JP2008-217964A).

Further, a technology for positioning a head at a center of each track on the basis of position data recorded on a disk so that a data width of each piece of burst data in a moving direction of the head is smaller than a track width of each track on the disk and is equal to or greater than a data reproducing width of the head has been proposed (see JP1997-63218A (JP-H09-63218A)).

SUMMARY OF THE INVENTION

Meanwhile, a linear servo signal recorded on a magnetic tape may not be linearly formed on the magnetic tape. In this case, there is a problem in that positioning of a data recording and reproducing head cannot be accurately performed using the servo signal recorded on the magnetic tape.

In the technologies described in JP1994-150201A (JP-H06-150201A), JP2008-217964A, and JP1997-63218A (JP-H09-63218A), the above problem is not taken into consideration.

The present disclosure has been made in view of the above circumstances, and an object of the present invention is to provide a recording device, a control device, a recording method, a recording tape cartridge, and a data recording and reproducing system capable of accurately positioning a data recording and reproducing head.

In order to achieve the above object, a recording device according to the present disclosure comprises a recording unit that records information on linearity of a servo signal recorded on a magnetic tape included in a recording tape cartridge on a recording medium included in the recording tape cartridge.

It should be noted that, in the recording device of the present disclosure, the information on the linearity of the servo signal may be information on linearity of a recording unit for the servo signal in a servo recording head that records the servo signal on the magnetic tape.

Further, in the recording device of the present disclosure, the recording unit may record information on a calculation equation obtained by approximating the information on the linearity on the recording medium.

Further, the control device of the present disclosure comprises a reading unit that reads information on the linearity of a servo signal recorded on a magnetic tape included in a recording tape cartridge recorded on a recording medium included in the recording tape cartridge; and a controller that performs control to position a data recording and reproducing head that performs reading or writing of data from or to a magnetic tape using the information on the linearity read by the reading unit.

Further, a recording method of the present disclosure is a recording method of recording information on linearity of a servo signal recorded on a magnetic tape included in a recording tape cartridge on a recording medium included in the recording tape cartridge.

Further, the recording tape cartridge of the present disclosure comprises a recording medium on which information on linearity of a servo signal recorded on a magnetic tape is recorded.

It should be noted that in the recording tape cartridge of the present disclosure, the recording medium may be an RFID tag or the magnetic tape.

Further, a data recording and reproducing system of the present disclosure comprises: a recording tape cartridge including a recording medium on which information on linearity of a servo signal recorded on a magnetic tape is recorded; and a control device including a reading unit that reads information on linearity recorded on the recording medium, and a controller that performs control to position a data recording and reproducing head that performs reading or writing of data from or to the magnetic tape using the information on the linearity read by the reading unit.

According to the present disclosure, it is possible to accurately position the data recording and reproducing head.

DESCRIPTION OF THE PREFERRED EMBODIMENTS

Hereinafter, embodiments of the present disclosure will be described in detail with reference to the drawings.

Figure 1:
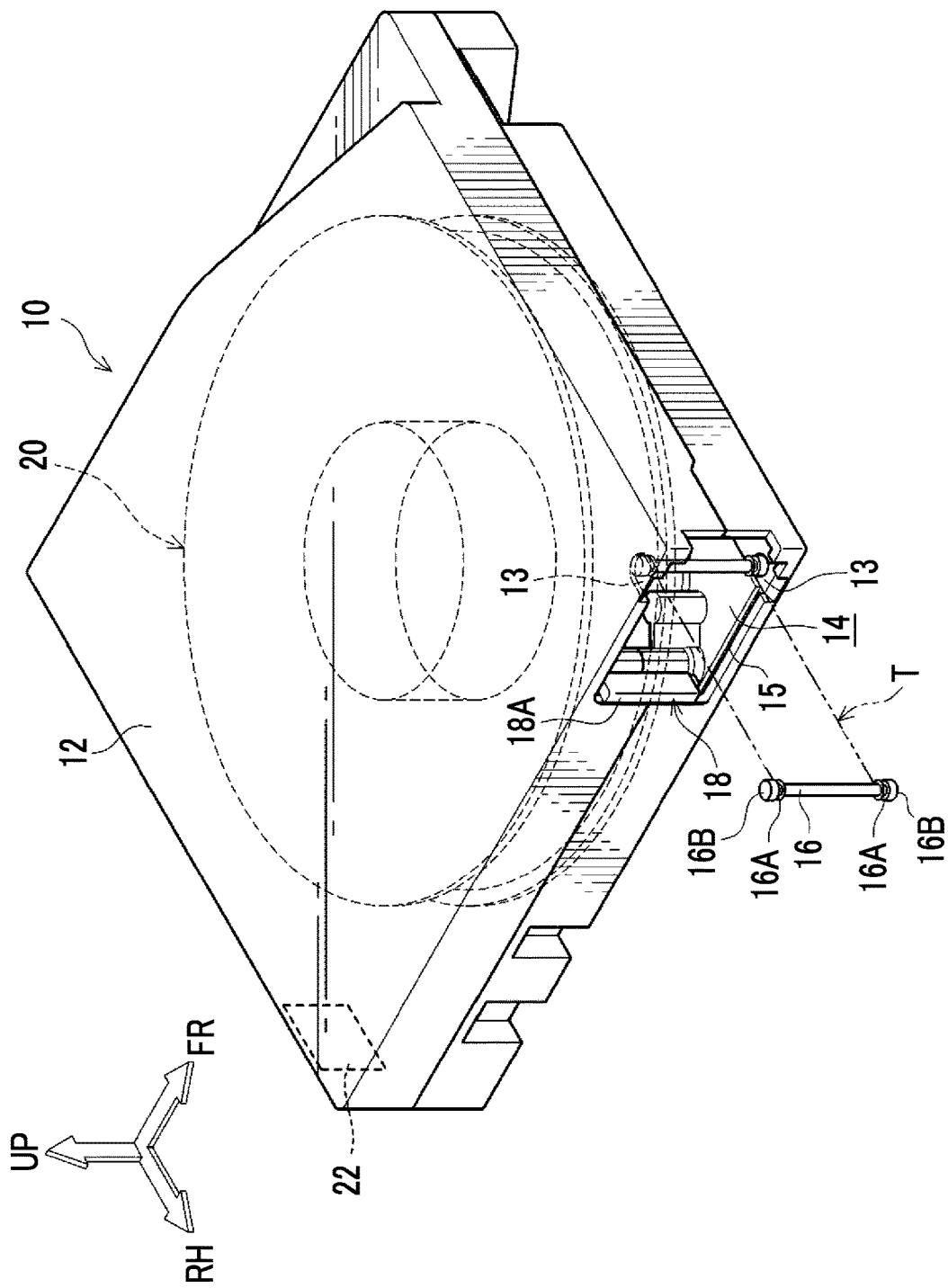
FIG. 1 is a perspective view illustrating an example of a recording tape cartridge according to an embodiment.

First, referring to FIG. 1, a configuration of a recording tape cartridge 10 according to the embodiment will be described. In FIG. 1, for convenience of description, a direction of loading to a tape drive 66 in the recording tape cartridge 10 is indicated by an arrow FR. Further, hereinafter, the direction indicated by the arrow FR is set as a front direction (a front side) of the recording tape cartridge 10. Further, hereinafter, a direction indicated by an arrow RH orthogonal to the arrow FR is set as a right direction (a right side) of the recording tape cartridge 10, and a direction indicated by an arrow UP orthogonal to the arrow FR and the arrow RH is set as an upward direction (an upper side) of the recording tape cartridge 10.

As illustrated in FIG. 1, the recording tape cartridge 10 according to the embodiment includes a case 12 formed of a resin material such as polycarbonate (PC) in a substantially rectangular box shape. Inside the case 12, a resin-made reel 20 around which a recording tape T such as a magnetic tape as an information recording and reproducing medium is wound and mounted is rotatably accommodated.

An opening 14 for pulling out the recording tape T is formed in a front portion of a right wall of the case 12. A leader pin 16 as a leader member that is pulled out while being locked by a pullout member (not illustrated) of the tape drive 66 is fixed to a free end portion of the recording tape T pulled out from the opening 14. An annular groove 16A is formed on both axial sides of the leader pin 16, and the annular groove 16A is locked to a hook of the pullout member or the like.

Further, a pair of upper and lower pin holding portions 13 for positioning and holding the leader pin 16 in the case 12 is formed inside the opening 14 of the case 12. The pin holding portion 13 is formed in a substantially semicircular shape with the side from which the recording tape T is pulled out being open, and both axial end portions 16B of the leader pin 16 in an upright state can enter or exit the open side of the pin holding portion 13 to the inside of the pin holding portion 13.

Further, the opening 14 of the case 12 is opened and closed by a door 18. The door 18 is formed in a substantially rectangular plate shape having a size capable of closing the opening 14. A groove 15 into which upper and lower end portions of the door 18 are slidably inserted is formed inside the opening 14 such that the door 18 can move along the right wall of the case 12.

Further, a convex portion 18A for an opening and closing operation protrudes rightward at a front end portion of the door 18. The convex portion 18A is engaged with an engaging member (not illustrated) of the tape drive 66 according to loading of the recording tape cartridge 10 into the tape drive 66, such that the door 18 is opened.

Further, a Radio Frequency Identifier (RFID) tag 22 as an example of a recording medium from which recorded information can be read without contact through radio communication or the like is built into the case 12. Note that, although FIG. 1 illustrates an example in which the RFID tag 22 is disposed at a right rear portion in the case 12, a disposing position of the RFID tag 22 in the case 12 is not particularly limited in a range in which there is no interference with, for example, the movable reel 20 or door 18. The disposing position of the RFID tag 22 in the case 12 may be, for example, a position at which information can be read without contact from the RFID tag 22 by a reading unit 70 to be described below.

Further, the RFID tag 22 according to the embodiment is an RFID tag of a method in which recorded information is transmitted to a reading device such as an RFID reader according to radio waves transmitted by the reading device (a so-called passive method).

Next, the servo signal recorded on the recording tape T of the recording tape cartridge 10 according to the embodiment will be described with reference to FIG. 2.

Figure 2:
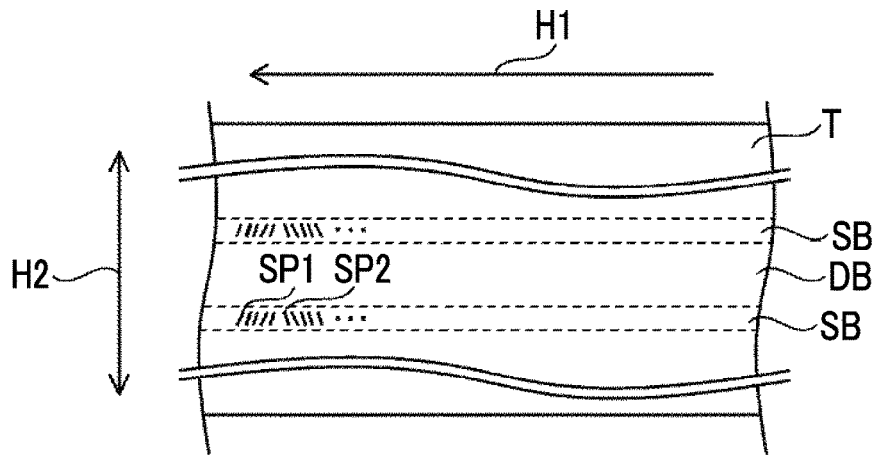
FIG. 2 is a plan view illustrating a servo signal according to the embodiment.

As illustrated in FIG. 2, in the recording tape T according to the embodiment, a servo band SB in which a servo signal is recorded and a data band DB in which data is recorded are alternately provided in an cross direction H2 (a width direction of the recording tape T) crossing with (in the embodiment, orthogonal to) a pullout direction H1 of the recording tape T. Further, the servo signal is a signal in which a plurality of sets of servo patterns SP1 and SP2 are recorded at a predetermined interval in the pullout direction H1.

Figure 3:
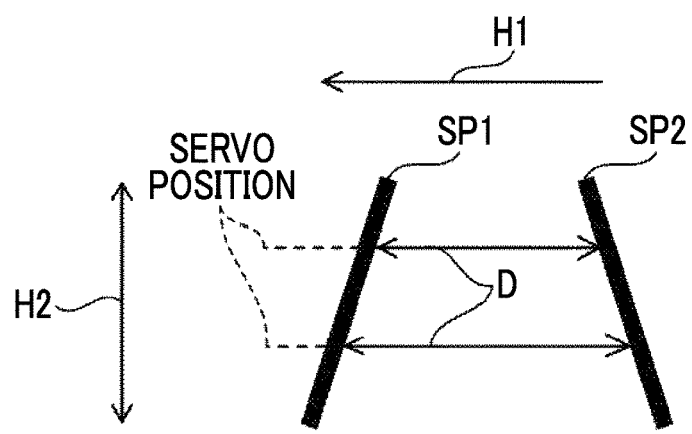
FIG. 3 is a plan view illustrating an example of a servo pattern according to the embodiment.

As illustrated in FIG. 3, the respective servo patterns SP1 and SP2 according to the embodiment are signals having linear shapes and different slopes. Specifically, the servo patterns SP1 and SP2 are signals in which a mutual distance D in the pullout direction H1 is gradually separated from one side to the other side in the cross direction H2. That is, the servo patterns SP1 and SP2 according to the embodiment are signals having different distances D at each position (hereinafter referred to as a "servo position") in the cross direction H2 of the servo band SB (see JP2004-318983A).

Figure 4:
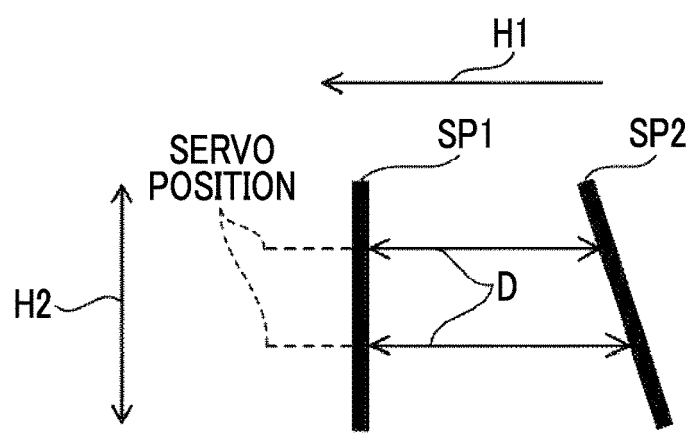
FIG. 4 is a plan view illustrating a servo pattern according to a modification example.
Figure 5:
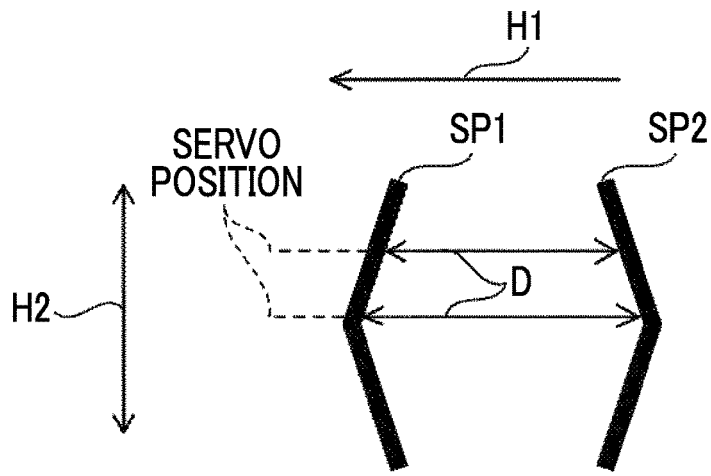
FIG. 5 is a plan view illustrating a servo pattern according to a modification example.

It should be noted that the servo patterns SP1 and SP2 are not limited to the example illustrated in FIG. 3 as long as the servo patterns SP1 and SP2 have linear shapes and different slopes. For example, as illustrated in FIG. 4, the servo pattern SP1 may be a signal having a linear shape having the same direction as the cross direction H2, and the servo pattern SP2 may be a signal having a linear shape inclined by a predetermined angle with respect to the cross direction H2. Further, as illustrated in FIG. 5, the servo patterns SP1 and SP2 may be signals in which the distance D gradually increases and then gradually decreases in the cross direction H2. Further, for example, the servo patterns SP1 and SP2 may have shapes as illustrated in FIGS. 3 to 6 of JP4383620B.

Incidentally, the above servo signal is used for positioning in the cross direction H2 of the data recording and reproducing head which reads or writes data from or to the data band DB of the recording tape T. A method of positioning the data recording and reproducing head using this servo signal is called a timing base servo scheme.

In the timing base servo scheme, positioning of the data recording and reproducing head is performed using a distance D associated with each servo position of the servo patterns SP1 and SP2 prepared in a table format or the like. Therefore, as a degree of linearity of the servo patterns SP1 and SP2 recorded on the recording tape T is lower, an error between the distance D between the servo pattern SP1 and the servo pattern SP2 at a certain servo position and the prepared distance D increases. Therefore, in this case, the accuracy of positioning of the data recording and reproducing head is degraded.

Figure 15:
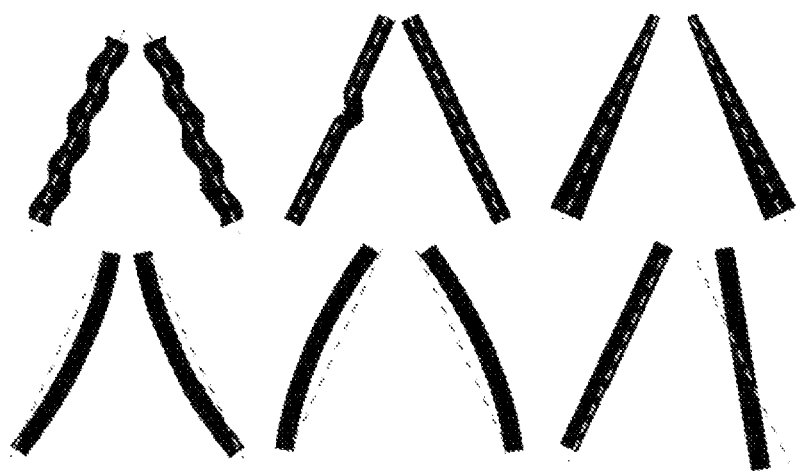
FIG. 15 is a plan view illustrating an example of a servo pattern in a case where the servo pattern is not linearly formed.

As an example, as illustrated in FIG. 15, the servo patterns SP1 and SP2 may not be recorded linearly due to various causes. In this regard, it has been found by intensive study of the present inventor that the degree of the linearity of the recording unit that records the servo signal of the servo recording head is dominant. Therefore, in the embodiment, information on the linearity of the recording unit that records the servo signal of the servo recording head is used.

Figure 6:
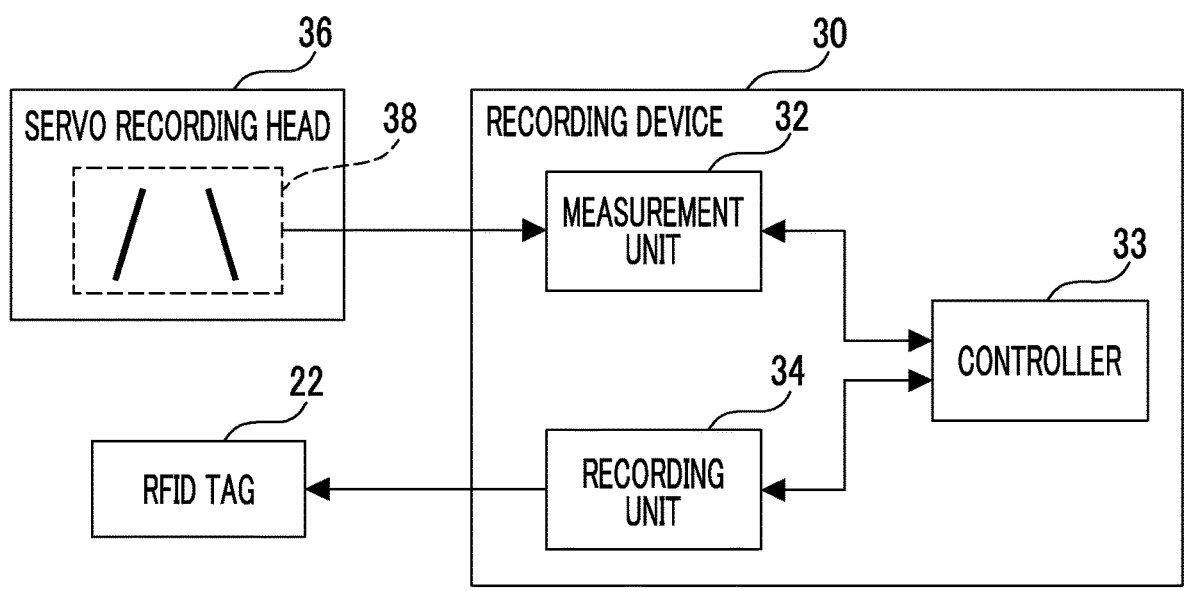
FIG. 6 is a block diagram illustrating an example of a configuration of a recording device and a servo recording head according to an embodiment.

Next, a configuration of the recording device 30 according to the embodiment will be described with reference to FIG. 6. As illustrated in FIG. 6, the recording device 30 according to the embodiment includes a measurement unit 32, a controller 33, and a recording unit 34. In addition, the servo recording head 36 includes a recording unit 38 that records a servo signal in the servo band SB of the recording tape T. A shape of the recording unit 38 is such a shape that a set of servo patterns SP1 and SP2 can be recorded in the servo band SB of the recording tape T. Further, the recording unit 38 magnetically records the servo patterns SP1 and SP2 at different positions in the pullout direction H1 of the servo band SB to thereby record the servo signal illustrated in FIG. 2 in the servo band SB. It should be noted that the recording device 30 may include a plurality of recording units 38.

Figures 13, 14:
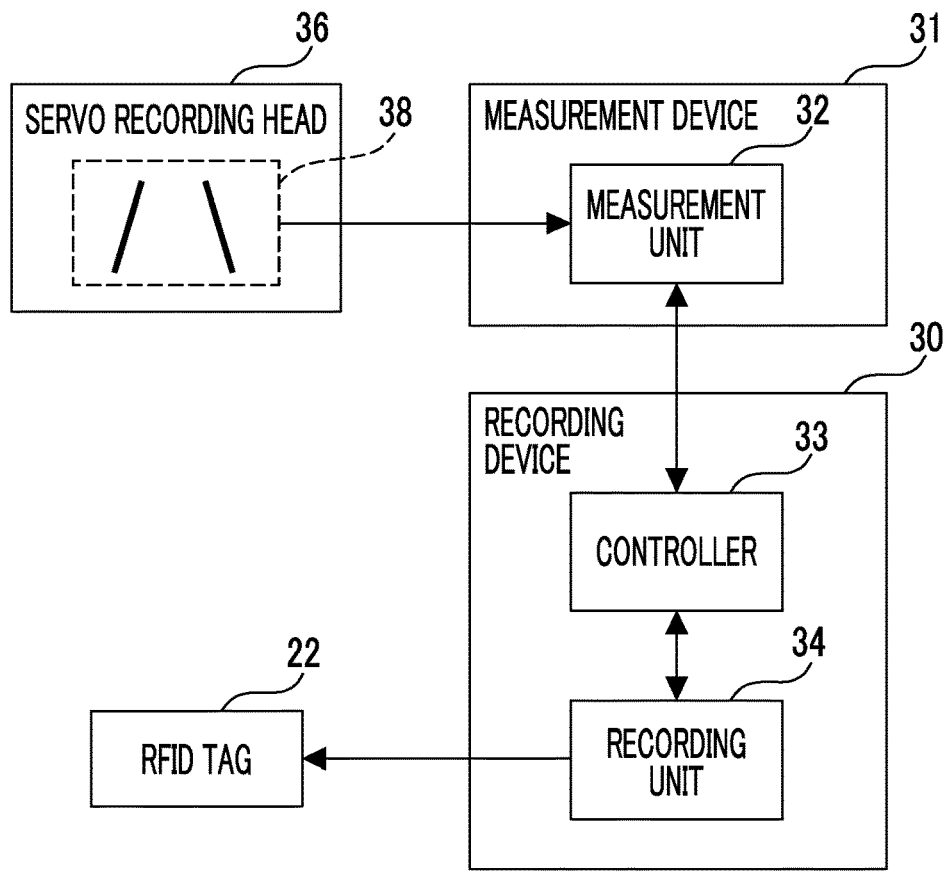
FIG. 13 is a block diagram illustrating an example of a configuration of a recording device, a measurement device, and a servo recording head according to the modification example.
FIG. 14 is a diagram illustrating an example of distance information according to the modification example.

The measurement unit 32 measures information on the linearity of the recording unit 38 of the servo recording head 36. In the embodiment, the measurement unit 32 measures the recording unit 38 and outputs a signal according to the linearity of the recording unit 38 to the controller 33. Examples of the measurement unit 32 include a magnetic Force microscope (MFM), a scanning electron microscope (SEM), and a laser microscope. The recording unit 34 records information on the linearity of the recording unit 38 measured by the measurement unit 32 on the RFID tag 22 in a noncontact manner under the control of the controller 33. An example of the recording unit 34 includes an RFID writer. It should be noted that the measurement unit 32 may not be included in the recording device 30. For example, as illustrated in FIG. 13, the information on the linearity of the recording unit 38 of the servo recording head 36 may be measured by the measurement device 31 including the measurement unit 32 separate from the recording device 30. In this case, a form in which the controller 33 of the recording device 30 acquires the information on the linearity of the recording unit 38 of the servo recording head 36 measured by the measurement device 31 is illustrated.

Figure 7:
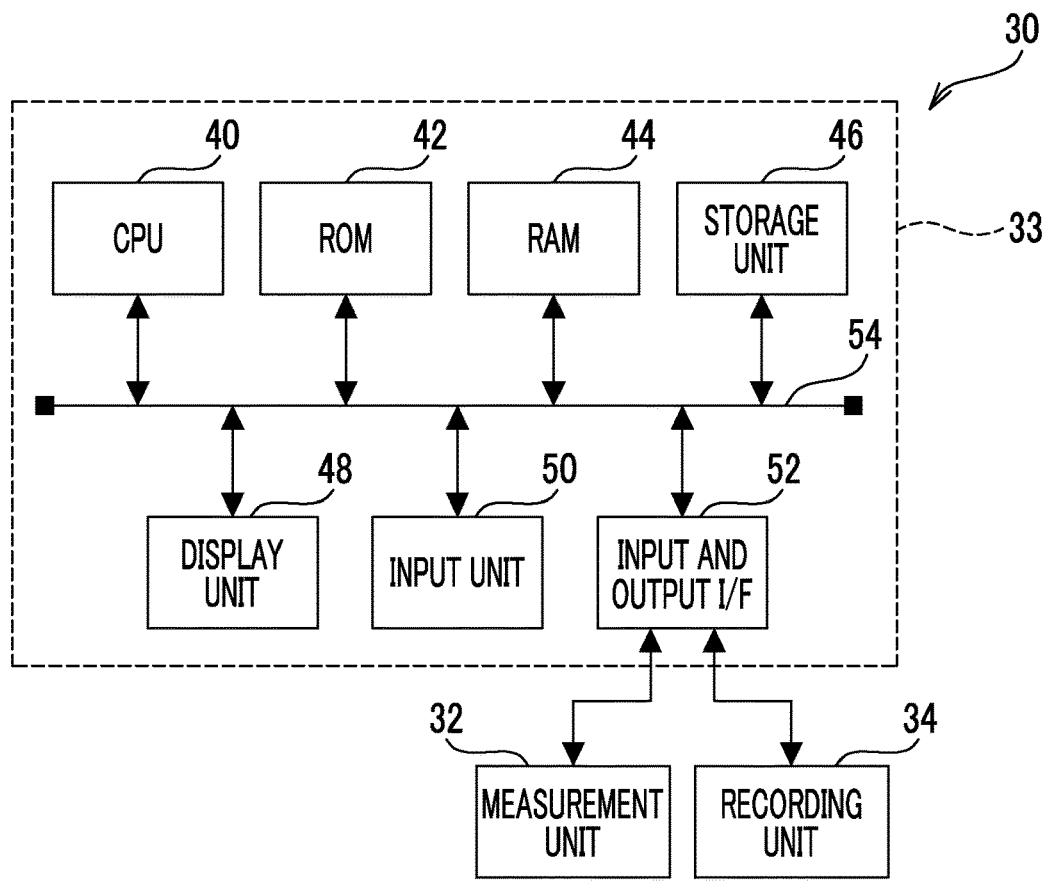
FIG. 7 is a block diagram illustrating an example of a configuration of main units of an electrical system of the recording device according to the embodiment.

Next, a configuration of main units of an electrical system of the recording device 30 according to the embodiment will be described with reference to FIG. 7. As illustrated in FIG. 7, the controller 33 of the recording device 30 includes a central processing unit (CPU) 40, and a read only memory (ROM) 42 in which various programs, various parameters, or the like is stored in advance. Further, the recording device 30 includes a nonvolatile storage unit 46 such as a random access memory (RAM) 44 or a hard disk drive (HDD) that is used as a work area or the like when the CPU 40 executes various programs.

Further, the controller 33 of the recording device 30 includes a display unit 48 such as a liquid crystal display, an input unit 50 such as a keyboard and a mouse, and an input and output interface (I/F) 52. The CPU 40, the ROM 42, the RAM 44, the storage unit 46, the display unit 48, the input unit 50, and the input and output I/F 52 are connected to each other via a bus 54.

The measurement unit 32 and the recording unit 34 are connected to the input and output I/F 52 of the controller 33 of the recording device 30. With the above configuration, the CPU 40 controls each of the measurement unit 32 and the recording unit 34 via the input and output I/F 52.

Figure 8:
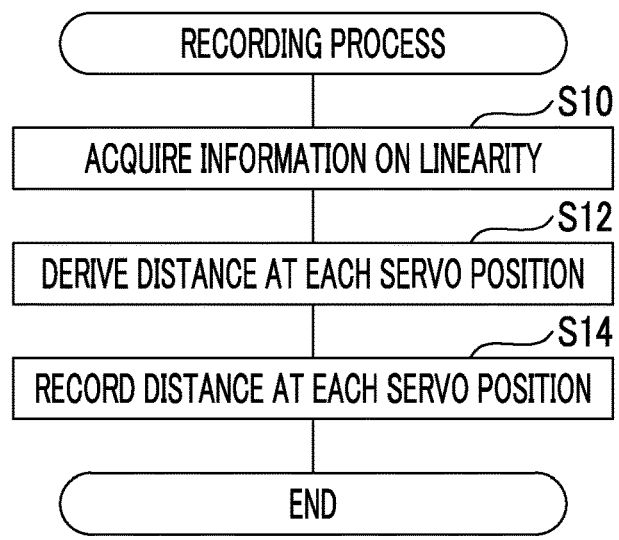
FIG. 8 is a flowchart illustrating an example of a recording process according to the embodiment.

Next, an operation of the recording device 30 according to the embodiment will be described with reference to FIG. 8. A recording process illustrated in FIG. 8 is executed by the CPU 40 of the controller 33 of the recording device 30 executing the recording program. It should be noted that this recording program is installed in the ROM 42 of the controller 33 of the recording device 30 in advance. Further, the recording process illustrated in FIG. 8 is executed, for example, when an instruction to execute the recording program is input by the user via the input unit 50.

In step S10 of FIG. 8, the CPU 40 controls the measurement unit 32 so that the information on the linearity of the recording unit 38 of the servo recording head 36 is measured. The CPU 40 acquires the information on the linearity measured by the measurement unit 32. In the next step S12, the CPU 40 derives a distance shown below using the information on the linearity acquired in step S10. That is, in this case, the CPU 40 derives a distance at a plurality of different positions (that is, a position corresponding to the servo position) in a direction corresponding to the cross direction H2 between a portion in which the servo pattern SP1 of the recording unit 38 is recorded and a portion in which the servo pattern SP2 is recorded.

In the next step S14, the CPU 40 controls the recording unit 34 so that information including a plurality of different servo positions derived in step S12 and a distance associated with each servo position (hereinafter referred to as "distance information") is recorded on the RFID tag 22. When the process of step S14 ends, the present recording process ends.

Figures 9, 10:
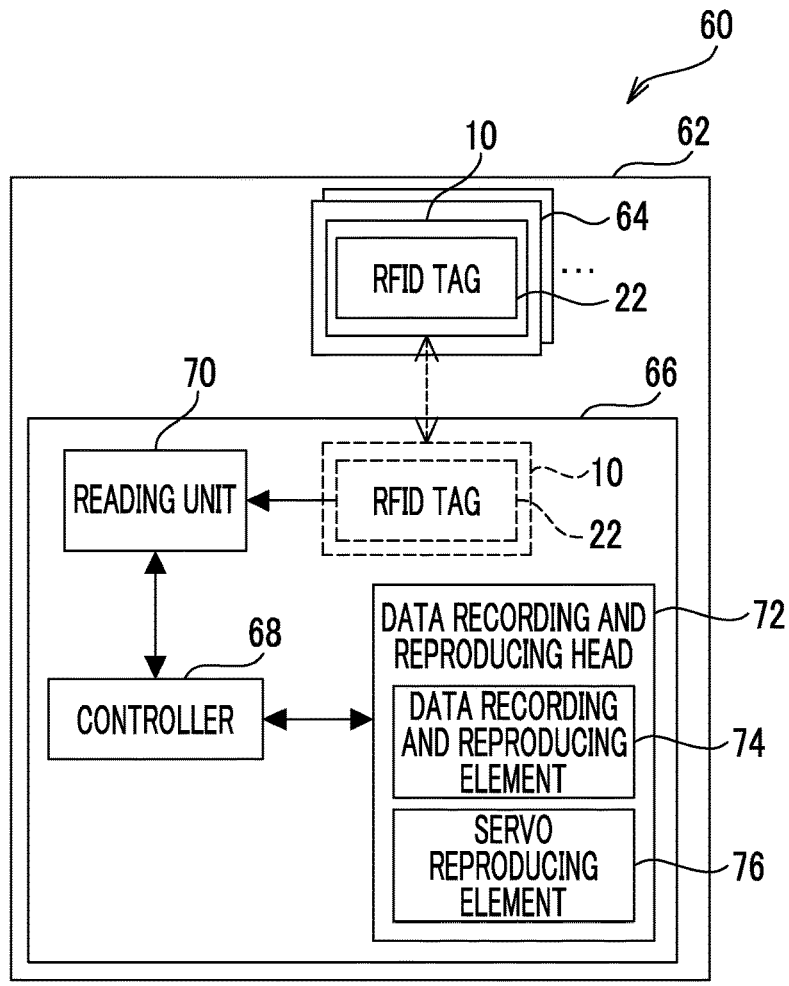
FIG. 9 is a diagram illustrating an example of distance information according to the embodiment.
FIG. 10 is a block diagram illustrating an example of a configuration of a data recording and reproducing system according to an embodiment.

FIG. 9 illustrates an example of the distance information. As illustrated in FIG. 9, the distance information includes a plurality of different servo positions and a distance associated with each servo position. It should be noted that, as an example, as illustrated in FIG. 14, the distance information may be stored for each servo band SB. Further, the CPU 40 may approximate a distance for each of a plurality of different servo positions and derive, as the distance information, information indicating a calculation equation with a servo position obtained through the approximation as an input and a distance as an output.

The recording process described above is executed, for example, in a process of manufacturing the recording tape cartridge 10, and the recording tape cartridge 10 including the RFID tag 22 on which the distance information is recorded is shipped to a shipping destination.

Next, a configuration of the data recording and reproducing system 60 that performs positioning of the data recording and reproducing head using the distance information recorded on the RFID tag 22 of the recording tape cartridge 10 will be described with reference to FIG. 10. As illustrated in FIG. 10, the data recording and reproducing system 60 according to the embodiment includes a tape library 62.

The tape library 62 according to the embodiment includes a plurality of slots 64 and a tape drive 66.

The recording tape cartridge 10 is stored in the slot 64. When reading from or writing to the recording tape T of the recording tape cartridge 10 is performed on the tape drive 66, the recording tape cartridge 10 taken out from the slot 64 is loaded. Further, after the reading or writing from or to the recording tape T of the recording tape cartridge 10 loaded in the tape drive 66 ends, the recording tape cartridge 10 is unloaded from the tape drive 66 and stored in the slot 64.

The tape drive 66 according to the embodiment includes a controller 68, a reading unit 70, and a data recording and reproducing head 72. In addition, the data recording and reproducing head 72 according to the embodiment includes a data recording and reproducing element 74 that performs reading or writing of data from or to the data band DB of the recording tape T, and a servo reproducing element 76 that reads a servo signal recorded in the servo band SB of the recording tape T.

The reading unit 70 according to the embodiment reads the distance information recorded on the RFID tag 22 built in the recording tape cartridge 10 in a noncontact manner under the control of the controller 68 and outputs the read distance information to the controller 68. Specifically, the reading unit 70 transmits radio waves to the RFID tag 22 under the control of the controller 68. When the RFID tag 22 receives the radio waves transmitted from the reading unit 70, the RFID tag 22 transmits the distance information recorded in the RFID tag 22 to the reading unit 70. The reading unit 70 receives the distance information transmitted from the RFID tag 22, and outputs the received distance information to the controller 68. An example of the reading unit 70 includes an RFID reader.

The controller 68 performs control to position the data recording and reproducing head 72 using the distance information input from the reading unit 70.

Figure 11:
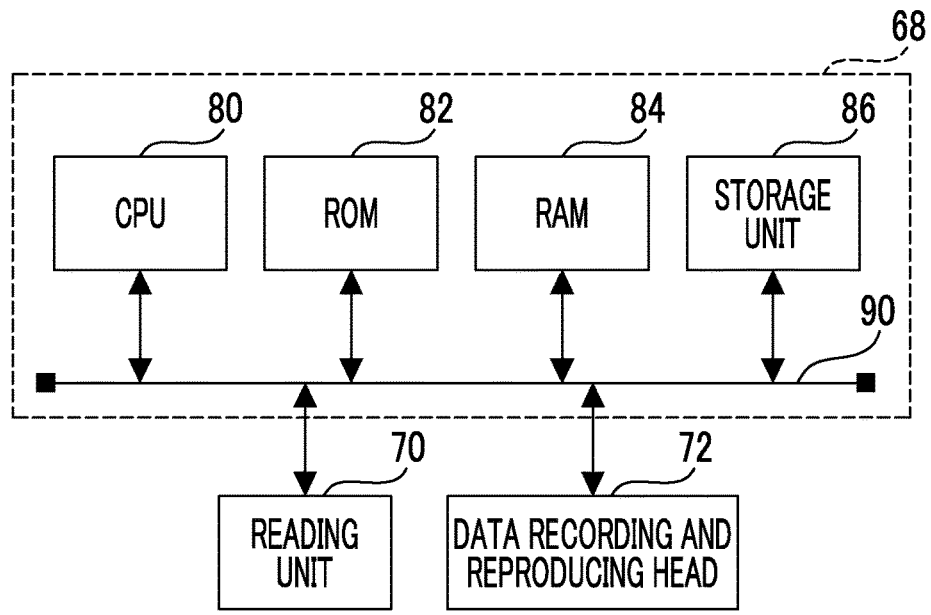
FIG. 11 is a block diagram illustrating an example of a configuration of main units of an electrical system of a controller according to an embodiment.

Next, a configuration of main units of an electrical system of the controller 68 according to the embodiment will be described with reference to FIG. 11. As illustrated in FIG. 11, the controller 68 includes a CPU 80 and a ROM 82 in which various programs, various parameters, or the like is stored in advance. Further, the controller 68 includes a RAM 84 that is used as a work area or the like when the CPU 80 executes various programs, and a nonvolatile storage unit 86 such as a flash memory. The respective units of the CPU 80, the ROM 82, the RAM 84, and the storage unit 86 are connected to each other via a bus 90.

The reading unit 70 and the data recording and reproducing head 72 are connected to the bus 90 of the controller 68. With the above configuration, the CPU 80 can control each of the reading unit 70 and the data recording and reproducing head 72 via the bus 90.

Figure 12:
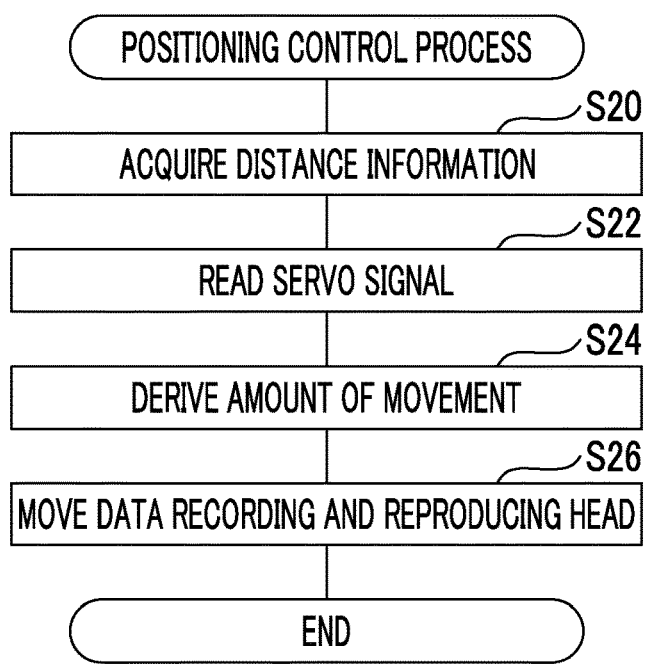
FIG. 12 is a flowchart illustrating an example of a positioning control process according to the embodiment.

Next, an operation of the data recording and reproducing system 60 according to the embodiment will be described with reference to FIG. 12. A positioning control process illustrated in FIG. 12 is executed by the CPU 80 of the controller 68 executing a positioning control program. It should be noted that the positioning control program is installed in the ROM 82 of the controller 68 in advance. The positioning control process illustrated in FIG. 12 is executed, for example, when an execution instruction to read or write data from or to the recording tape T of the recording tape cartridge 10 is input to the controller 68. In addition, here, it is assumed that the positioning control process is executed in a state where the recording tape cartridge 10 is loaded in the tape drive 66.

In step S20 of FIG. 12, the CPU 80 controls the reading unit 70 to read the distance information recorded in the RFID tag 22 of the recording tape cartridge 10. The CPU 80 acquires the distance information read by the reading unit 70.

In the next step S22, the CPU 80 controls the data recording and reproducing head 72 to cause the servo reproducing element 76 to read the servo signal recorded in the servo band SB of the recording tape T.

In the next step S24, the CPU 80 derives a distance shown below from a difference between a timing at which the servo pattern SP1 of the servo signal read in step S22 has been read and a timing at which the servo pattern SP2 has been read. That is, in this case, the CPU 80 derives the distance between the servo pattern SP1 and the servo pattern SP2 at the position in the cross direction H2 of the servo reproducing element 76 at a current point in time. Further, the CPU 80 performs an interpolation process using the closest distance on the side shorter than the derived distance and the closest distance on the side longer than the derived distance in the distance information acquired in step S20 to derive a servo position corresponding to the derived distance.

The CPU 80 derives the amount of movement from a servo position corresponding to the derived distance to a servo position corresponding to a predetermined target position.

In the next step S26, the CPU 80 controls the data recording and reproducing head 72 to move the data recording and reproducing head 72 in the cross direction H2 by the amount of movement derived in step S24. Through a process of moving the data recording and reproducing head 72, the CPU 80 performs control to position the data recording and reproducing element 74 in the cross direction H2. Reading or writing of data from or to the data band DB of the recording tape T is performed by the data recording and reproducing element 74 according to the position determined in step S26. When the reading or the writing of data from or to the data band DB ends, the recording tape cartridge 10 is unloaded from the tape drive 66, and the unloaded recording tape cartridge 10 is stored in the slot 64. When the process of step S26 ends, the present positioning control process ends.

As described above, according to the embodiment, the information on the linearity of the recording unit for the servo signal in the servo recording head is recorded on the recording medium of the recording tape cartridge. Therefore, it is possible to easily record the information indicating the linearity of the servo signal. Further, it is possible to accurately position the data recording and reproducing head using the information indicating the linearity.

It should be noted that, in the above embodiment, the case where the distance information is recorded in the RFID tag 22 has been described, but the present invention is not limited thereto. For example, the distance information may be repeatedly recorded in a head portion or over an entire length of the data band DB or the servo band SB of the recording tape T or may be recorded in a bar code recorded at a predetermined position on the outer circumferential surface of the case 12. In addition, the distance information may be recorded in a two-dimensional code such as a QR code (registered trademark) recorded at a predetermined position on the outer circumferential surface of the case 12.

Further, in the above embodiment, the controller 68 may store the distance information read from the RFID tag 22 in the storage unit 86 in association with identification information of the recording tape cartridge 10. In this case, for example, an aspect in which the identification information of the recording tape cartridge 10 is stored in the RFID tag 22, and the identification information of the recording tape cartridge 10 is read from the RFID tag 22 is illustrated. Further, in this case, an aspect in which when the recording tape cartridge 10 of which corresponding distance information is stored in the storage unit 86 is used, the controller 68 positions the data recording and reproducing element 74 using the distance information stored in the storage unit 86 is illustrated. Further, for example, a controller including a storage unit may be provided in the tape library 62, and the distance information read from the RFID tag 22 may be stored in the storage unit of this controller.

Further, in the above embodiment, information on other linearity of the recording unit 38 of the servo recording head 36 measured by the measurement unit 32 (for example, image information including the recording unit 38, coordinate information of the recording unit 38, or the like) may be recorded on the RFID tag 22 or the storage unit 86, instead of the distance information. In this case, an aspect in which when the controller 68 uses the recording tape cartridge 10, the distance information is generated from the information recorded in the RFID tag 22 or the storage unit 86 is illustrated.

Further, in the above embodiment, identification information such as a serial number of the servo recording head 36, which is a measurement target of the measurement unit 32, may be recorded in the RFID tag 22 instead of the distance information. In this case, an aspect in which a database in which the serial number of the servo recording head 36 and the distance information are associated with each other is stored in the storage unit 86 of the controller 68 in advance is illustrated. In this case, an aspect in which the controller 68 acquires the distance information from the database stored in the storage unit 86 using the identification information recorded in the RFID tag 22 when the recording tape cartridge 10 is used is illustrated. Further, for example, a controller including a storage unit may be provided in the tape library 62, and the database may be stored in the storage unit included in the controller.

Further, in the above embodiment, information indicating a calculation equation obtained by approximating each of a shape of a portion in which the servo pattern SP1 of the recording unit 38 of the servo recording head 36 is recorded and a shape of a portion in which the servo pattern SP2 is recorded may be recorded in the RFID tag 22 instead of the distance information. In this case, an aspect in which the controller 68 derives a distance corresponding to each servo position using the information indicating the calculation equation is illustrated.

Further, in the above embodiment, the case where the RFID tag 22 has been applied as a recording medium from which recorded information can be read in a noncontact manner has been described, but the present invention is not limited thereto. For example, an aspect in which a memory card having a wireless communication function is applied as the recording medium from which the recorded information can be read in a noncontact manner may be adopted.

Further, in the above embodiment, the case where the RFID tag using a passive method is applied as the RFID tag 22 has been described, but the present invention is not limited thereto. For example, an RFID tag using a method of transmitting radio waves (a so-called active method) may be applied as the RFID tag 22.

Further, in the above embodiment, the case in which the information on the linearity of the recording unit 38 of the servo recording head 36 is measured has been described, but the present invention is not limited thereto. The information on the linearity of the servo patterns SP1 and SP2 recorded in the servo band SB of the recording tape T may be measured. In this case, information on linearity of one set of servo patterns SP1 and SP2 may be measured, or information on linearity of a plurality of sets of servo patterns SP1 and SP2 may be measured and averaged.

Further, in the above embodiment, various types of processors other than the CPU may execute the recording process and the positioning control process executed by the CPU executing the software (program). As the processor in this case, a programmable logic device (PLD) of which a circuit configuration can be changed after manufacture such as a field-programmable gate array (FPGA), a dedicated electrical circuit which is a processor having a circuit configuration designed to be dedicated for execution of a specific process such as an application specific integrated circuit (ASIC), or the like is illustrated. Further, the recording process and the positioning control process may be executed by one of the various processors, or may be executed by a combination of two or more of the same or different types of processors (for example, a combination of a plurality of FPGAs or a CPU and an FPGA). A hardware structure of the various processors is, more specifically, an electrical circuit in which circuit elements such as semiconductor elements are combined.

Further, in the above embodiment, the aspect in which the recording program is stored (installed) in the ROM 42 in advance has been described, but the present invention is not limited thereto. The recording program may be provided as a form recorded on a recording medium such as a compact disk read only memory (CD-ROM), a digital versatile disk read only memory (DVD-ROM), and a universal serial bus (USB) memory. Further, the recording program may be a form downloaded from an external device over a network.

Further, in the above embodiment, an aspect in which the positioning control program is stored (installed) in the ROM 82 in advance has been described, but the present invention is not limited thereto. The positioning control program may be provided in an aspect in which the positioning control program has been recorded on a recording medium such as a CD-ROM, a DVD-ROM, or a USB memory. Further, the positioning control program may be downloaded from an external device over a network.

EXPLANATION OF REFERENCES

10: recording tape cartridge
12: case
13: pin holding portion
14: opening
15: groove
16: leader pin
16A: annular groove
16B: both end portions
18: door
18A: convex portion
20: reel
22: RFID tag
30: recording device
31: measurement device
32: measurement unit
33, 68: controller
34, 38: recording unit
36: servo recording head
40, 80: CPU
42, 82: ROM
44, 84: RAM 46, 86: storage unit
48: display unit
50: input unit
52: input and output I/F
54, 90: bus
60: data recording and reproducing system
62: tape library
64: slot
66: tape drive
70: reading unit
72: data recording and reproducing head
74: data recording and reproducing element
76: servo reproducing element
D: distance
DB: data band
FR: arrow
H1: pullout direction
H2: cross direction
RH: arrow
SP1, SP2: servo pattern
SB: servo band
T: recording tape
UP: arrow

What is claimed is:

1. A control device comprising:
a reading unit that reads information on linearity of a servo signal recorded on a magnetic tape included in a recording tape cartridge recorded on a recording medium included in the recording tape cartridge; and
a controller that performs control to position a data recording and reproducing head that performs reading or writing of data from or to a magnetic tape using the information read by the reading unit; wherein
the information on the linearity of the servo signal is information on the degree of linearity of a recording unit for the servo signal in a servo recording head that records the servo signal on the magnetic tape.

2. The control device according to claim 1, wherein the recording unit records information on a calculation equation obtained by approximating the information on the linearity on the recording medium.

3. The control device cartridge according to claim 1, wherein the recording medium is an RFID tag or the magnetic tape.

4. A data recording and reproducing system comprising:
a recording tape cartridge including a recording medium on which information on linearity of a servo signal recorded on a magnetic tape is recorded; and
a control device including a reading unit that reads information on linearity recorded on the recording medium, and a controller that performs control to position a data recording and reproducing head that performs reading or writing of data from or to the magnetic tape using the information read by the reading unit; wherein
the information on the linearity of the servo signal is information on the degree of linearity of a recording unit for the servo signal in a servo recording head that records the servo signal on the magnetic tape.

5. The data recording and reproducing system according to claim 4, wherein the information on the linearity of the servo signal is information on linearity of a recording unit for the servo signal in a servo recording head that records the servo signal on the magnetic tape.

6. The data recording and reproducing system according to claim 4, wherein the recording unit records information on a calculation equation obtained by approximating the information on the linearity on the recording medium.

7. The data recording and reproducing system according to claim 4, wherein the recording medium is an RFID tag or the magnetic tape.

* * * * *